(12) United States Patent
Li et al.

(10) Patent No.: US 9,918,088 B2
(45) Date of Patent: Mar. 13, 2018

(54) TRANSFORM AND INVERSE TRANSFORM CIRCUIT AND METHOD

(71) Applicant: Intel Corporation, Santa Clara, CA (US)

(72) Inventors: Qiang Li, Beijing (CN); Jumei Li, Beijing (CN); Yinglai Xi, Beijing (CN); Fei Su, Beijing (CN)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 14/458,524

(22) Filed: Aug. 13, 2014

(65) Prior Publication Data

US 2015/0195522 A1 Jul. 9, 2015

(30) Foreign Application Priority Data

Jan. 9, 2014 (CN) .......................... 2014 1 0009494

(51) Int. Cl.
*H04N 19/12* (2014.01)
*H04N 19/124* (2014.01)
(Continued)

(52) U.S. Cl.
CPC ........... *H04N 19/12* (2014.11); *H04N 19/124* (2014.11); *H04N 19/157* (2014.11);
(Continued)

(58) Field of Classification Search
CPC .... H04N 19/12; H04N 19/124; H04N 19/156; H04N 19/157; H04N 19/179; H04N 19/42; H04N 19/436
See application file for complete search history.

(56) References Cited

U.S. PATENT DOCUMENTS 5,301,136 A * 4/1994 McMillan, Jr. ........ H04N 19/60
375/E7.226
5,416,854 A * 5/1995 Fukuda ................. G06F 17/147
375/240.18
(Continued)

FOREIGN PATENT DOCUMENTS

CN 101330616 12/2008
CN 101841711 9/2010

OTHER PUBLICATIONS

Office Action and Search Report for Chinese Patent Application No. 201410009494.X dated May 24, 2016, No translation available.
(Continued)

*Primary Examiner* — Peter D Le
(74) *Attorney, Agent, or Firm* — Green, Howard, & Mughal LLP

(57) ABSTRACT

A transform and inverse transform circuit is provided. The transform and inverse transform circuit includes: at least one quantization and inverse quantization circuit, including at least one quantization and inverse quantization unit, wherein each quantization and inverse quantization unit includes a plurality of first coefficients, and each quantization and inverse quantization unit performs quantization or inverse quantization on one of multiple ways of inputting data; and at least one one-dimensional transform circuit, coupled to the quantization and inverse quantization circuit, wherein the one-dimensional transform circuit includes a plurality of second coefficients, wherein the one-dimensional transform circuit performs one-dimensional transform on the inputting data processed by the quantization and inverse quantization circuit, wherein the plurality of first coefficients and the plurality of second coefficients are set up based on a video codec standard.

12 Claims, 14 Drawing Sheets

(51) Int. Cl.
  *H04N 19/157* (2014.01)
  *H04N 19/179* (2014.01)
  *H04N 19/42* (2014.01)
  *H04N 19/156* (2014.01)
  *H04N 19/436* (2014.01)

(52) U.S. Cl.
  CPC ........... *H04N 19/179* (2014.11); *H04N 19/42* (2014.11); *H04N 19/156* (2014.11); *H04N 19/436* (2014.11)

(56) References Cited

U.S. PATENT DOCUMENTS

| | | | | |
|---|---|---|---|---|
| 5,491,515 A * | 2/1996 | Suzuki | ................... | H04N 19/61 348/401.1 |
| 5,659,362 A * | 8/1997 | Kovac | ................... | G06T 9/007 348/384.1 |
| 5,812,791 A * | 9/1998 | Wasserman | ............ | H04N 19/61 375/240.15 |
| 5,875,266 A * | 2/1999 | Fukuda | ................ | H04N 19/176 375/E7.093 |
| 5,966,470 A * | 10/1999 | Miyashita | ............... | G06T 9/007 382/246 |
| 6,532,541 B1 * | 3/2003 | Chang | ................... | G06T 1/0028 380/216 |
| 6,539,120 B1 * | 3/2003 | Sita | ........................... | G06T 1/60 348/E5.108 |
| 6,643,451 B1 * | 11/2003 | Tokura | ..................... | H04N 5/76 348/E7.054 |
| 6,680,974 B1 * | 1/2004 | Faryar | .................... | H04N 19/60 375/240.18 |
| 6,909,812 B1 * | 6/2005 | Faryar | .................... | H04N 19/60 375/E7.028 |
| 7,142,720 B1 * | 11/2006 | Fukuda | .................. | H04N 19/45 375/E7.028 |
| 7,437,011 B2 | 10/2008 | Kato | | |
| 2002/0163965 A1 * | 11/2002 | Lee | ........................ | H04N 19/60 375/240.03 |
| 2004/0086192 A1 * | 5/2004 | Togashi | ................. | H04N 19/15 382/251 |
| 2010/0218022 A1 * | 8/2010 | Matsuyama | ........ | G06F 9/30189 713/323 |
| 2010/0226429 A1 * | 9/2010 | Lee | ...................... | H04N 19/176 375/240.03 |
| 2013/0034150 A1 * | 2/2013 | Sadafale | .............. | H04N 19/129 375/240.03 |

OTHER PUBLICATIONS

Notice of Allowance dated Nov. 7, 2016 for Chinese Patent Application No. 20141000949.X.

* cited by examiner

| C6 | C12 | C13 | C15 |
|---|---|---|---|
| C5 | C7 | C11 | C14 |
| C1 | C4 | C8 | C10 |
| C0 | C2 | C3 | C9 |

| 0 | 1 | 2 | 3 | 4 | 5 | 6 | 7 | 8 | 9 | 10 | 11 | 12 | 13 |

| 14 | 15 | 16 | 17 | 18 | 19 | 20 | 21 | 22 | 23 | 24 | 25 | 26 |

US 9,918,088 B2

TRANSFORM AND INVERSE TRANSFORM CIRCUIT AND METHOD

CROSS REFERENCE TO RELATED APPLICATIONS

This Application claims priority of China Patent Application No. CN 201410009494.X, filed on Jan. 9, 2014, the entirety of which is incorporated by reference herein.

BACKGROUND OF THE INVENTION

Field of the Invention

The present invention relates to video processing, and in particular to a transform and inverse transform method and a transform and inverse transform circuit implementing the method thereof compatible with various video codec standards.

Description of the Related Art

Video encoders/decoders are widely used in daily life. For example, video encoders/decoders can be used on DVDs, VCDs, satellite and terrestrial TV broadcasting systems, and the Internet. Generally, online video content is compressed by various encoders. In order to view the video contents correctly, the user has to install a related video decoder. The input video frames are usually divided into macroblocks for encoding, and the size of each macroblock is usually a 16×16 luminance block and corresponding chrominance blocks. Afterwards, motion compensation of the macroblocks is performed to predict the current frame based on the encoded frames. The statistical correlation of the spatial domain is reduced by using the macroblock transform or sub-band division. The output coefficients of the transform are then quantized, and the quantized coefficients after entropy encoding become a portion of the output bitstream. Then, a symbol can be obtained by encoding the quantized coefficients. Generally, entropy encoding is performed by using variable-length encoding. The decoding process is the reverse of the encoding process, wherein the step, which the original information cannot be restored, is quantization. Accordingly, the original information should be restored as much as possible, and the process is regarded as inverse quantization.

Currently, various video compression standards are used in video codec systems on the market, such as H.264, VP8, and Real Video standards. However, the number of logic gates of the video codec systems is very large, and only a specific video codec standard can be processed in current video codec systems, which lacks flexibility.

In view of the above, there is a demand for a video codec system capable of effectively utilizing the logic gate circuits to reduce the chip area and being flexibly compatible with various video codec standards.

BRIEF SUMMARY OF THE INVENTION

In an exemplary embodiment, a transform and inverse transform circuit is provided. The transform and inverse transform circuit includes: at least one quantization and inverse quantization circuit, comprising at least one quantization and inverse quantization unit, wherein each quantization and inverse quantization unit includes a plurality of first coefficients, and each quantization and inverse quantization unit performs quantization or inverse quantization on one of multiple ways of inputting data; and at least one one-dimensional (1D) transform circuit, coupled to the quantization and inverse quantization circuit, wherein the 1D transform circuit comprises a plurality of second coefficients, wherein the 1D transform circuit performs 1D transform on the inputting data processed by the quantization and inverse quantization circuit, wherein the plurality of first coefficients and the plurality of second coefficients are set up based on a video codec standard.

In another exemplary embodiment, a transform and inverse transform method is provided. The method includes the steps of: performing quantization or inverse quantization to inputting data by using a quantization and inverse quantization circuit, wherein the quantization and inverse quantization circuit comprises at least one quantization and inverse quantization unit, and each quantization and inverse quantization unit includes a plurality of first coefficients, wherein each quantization and inverse quantization unit performs quantization or inverse quantization on one of multiple ways of inputting data; and performing one-dimensional (1D) transform to the inputting data processed by the quantization and inverse quantization circuit by a 1D transform circuit, wherein the 1D transform circuit comprises a plurality of second coefficients, wherein the plurality of first coefficients and the plurality of second coefficients are set up based on a video codec standard.

BRIEF DESCRIPTION OF THE DRAWINGS

The present invention can be more fully understood by reading the subsequent detailed description and examples with references made to the accompanying drawings, wherein:

FIG. 4B is a diagram illustrating the definitions of decoding coefficients for Real Video decoding operations by the quantization and inverse quantization circuit in accordance with an embodiment of the invention;

FIG. 10 is a diagram illustrating the non-zero flags in accordance with an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A. System Architecture

Figure 1:
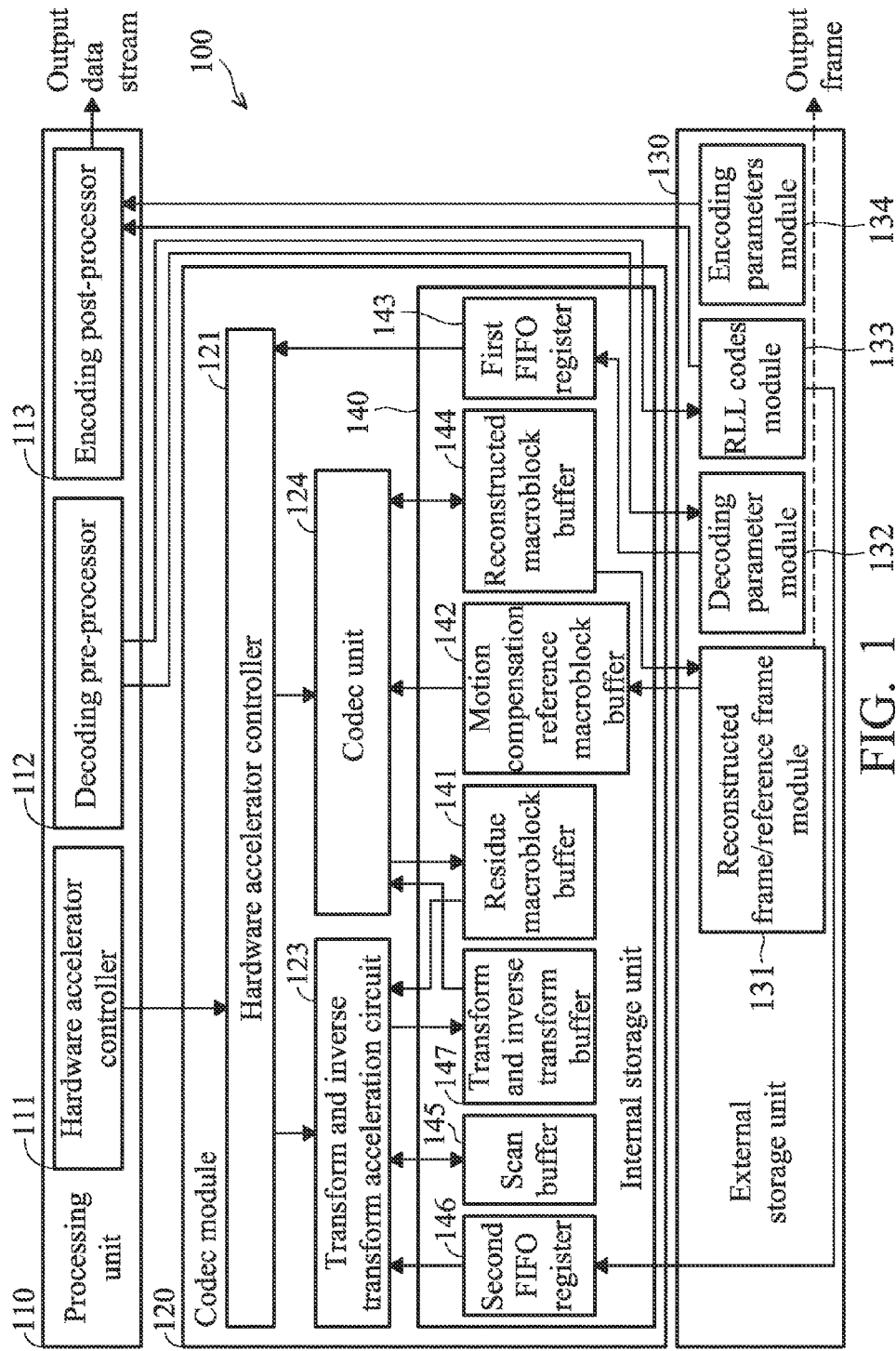
FIG. 1 is a block diagram illustrating a video codec system 100 in accordance with an embodiment of the invention.

FIG. 1 is a block diagram illustrating a video codec system 100 in accordance with an embodiment of the invention. The video codec system 100 may include a processing unit 110, a codec module 120, and an external storage unit 130. When performing video encoding/decoding processes compatible with H.264/AVC or VC-1 standards, the processing unit 110 may be a controller configured to execute a hardware accelerator control program, and execute pre-processing procedures and post-processing procedures such as an entropy decoding program and a decoding parameters calculating program. For example, the processing unit 110 may be a central processing unit (CPU), a digital signal processor (DSP), or other equivalent circuit implementing the same functions. The codec module 120 may include a hardware accelerator controller 121, a transform and inverse transform acceleration circuit 123, a codec unit 124, and an internal storage unit 140. In an embodiment, the codec module 120 may include a hardware codec unit and a software codec unit (not shown). The transform and inverse transform acceleration circuit 123 may utilize a digital circuit or hardware to implement functions of the transform and inverse transform processes in the video codec processes, such as 4×4 DCT transform and inverse transform, 4×4 Hadamard transform and inverse transform, 2×2 Hadamard transform and inverse transform/quantization and inverse quantization in the H.264 encoding processes; quantization and inverse quantization, 4×4 DCT transform and inverse transform, 4×4 Hadamard transform and inverse transform, 2×2 Hadamard transform and inverse transform in the H.264 decoding processes; quantization and inverse quantization, 4×4 DCT transform and inverse transform, 4×4 Walsh-Hadamard transform and inverse transform in the VP8 codec processes; and quantization and inverse quantization, 4×4 transform and inverse transform, square 4×4 transform and inverse transform in the Real Video standards such as RV8, RV9 and RV10.

In addition, the codec unit 124 may be hardware or software of the DSP. For example, the codec unit 124 is configured to perform functions such as motion estimation, motion compensation, intra-frame prediction, and loop de-blocking filtering of the video codec processes. The aforementioned functions can be implemented by hardware or software with current technologies, and the details will be omitted here.

For convenience of description, the hardware accelerator controller 121, the transform and inverse transform acceleration circuit 123, and the codec unit 124 of the codec module 120 are implemented by hardware. The hardware components of the processing unit 110 and the codec module 120 may use "frame level flow control", which indicates that when the current frame is decoded by the hardware components of the codec module 120, the next frame is decoded by the processing unit 110. Macroblock level flow control is utilized in data processing of each component of the codec module 120, which may be implemented by hardware or a combination of hardware and software. The external storage unit 130 is configured to store reference frames, reconstructed frames, decoding parameters, and run-length limited codes (RLL codes). For example, the external storage unit 130 may be a volatile memory such as a random access memory (RAM) (e.g. DRAM, SRAM), or a non-volatile memory such as a read-only memory (ROM) or CDROM, or combination of a volatile memory and a non-volatile memory. The external storage unit 130 may include a reconstructed frame/reference frame module 131, a decoding parameter module 132, an RLL codes module 133, and an encoding parameters module 134.

In an embodiment, the processing unit 110 may include a hardware accelerator controller 111, a decoding pre-processor 112, and an encoding post-processor 113. The hardware accelerator controller 111 of the processing unit 110 may control each component of the codec module 120. The processing unit 110 may set up registers associated with the hardware accelerator controller 121 and check whether the register settings are correct, and then activate the codec module 120 to start decoding the current frame. The DMA channel should be registered and authorized in the processing unit 110, and the processing unit 110 may check the status of the DMA channel, set up the registers associated with the DMA controller (not shown) to activate the DMA controller. When the processing unit 110 has activated the codec module 120 and the DMA controller, the codec module 120 starts decoding. It should be noted that the control between the codec module 120 and the processing unit 110 is frame level flow control. That is, the processing unit 110 may pre-execute the decoding program, e.g. program codes, before the hardware accelerators finish decoding each current frame, thereby the processing unit 110 may perform calculation of entropy decoding of the next frame and calculation of decoding parameters. The aforementioned decoding program may check whether the hardware codec units have completed decoding the current frame. When the codec module 120 has not completed decoding the current frame, other ready programs having higher priorities may take control of the processing unit 110. Specifically, when the codec module 120 has completed decoding the current frame, the hardware accelerator controller 121 may generate an interrupt signal, and the service interruption program executed by the processing unit 110 may assign the decoding program a flag indicating completion of decoding. Meanwhile, the decoding program may take control of the processing unit 110 and proceed to decoding the next frame.

In an embodiment, the processing unit 110 may further execute encoding post-processing procedures. For example, the encoding post-processing procedures may include an entropy coding program and a rate control program. For example, as illustrated in FIG. 1, the entropy coding program of the encoding post-processing procedures can be implemented by reading encoding parameters and RLL codes from the external storage unit 130 and outputting the bitstream of a frame. The rate control program may calculate the quantization coefficients of the next frame based on the encoding results, total bit rate, and frame rate of the current frame, and perform a boundary extension of the reconstructed frame output by the hardware accelerators, thereby performing motion estimation of the next frame.

In another embodiment, the processing may further execute decoding pre-processing programs such as calculation of entropy decoding and decoding control parameters. The processing unit 110 may further perform entropy decoding to the video bitstream, and calculate filtering parameters such as boundary strengths. The processing unit 110 may output the calculated decoding parameters and RLL codes to the external storage unit 130 (e.g. an external memory).

In an embodiment, the internal storage unit 140 may include a residue macroblock buffer (ResMBB) 141, a motion compensation reference macroblock buffer (MCRMB) 142, a first first-in-first-out (FIFO) register 143, a reconstructed macroblock buffer (RecMBB) 144, a scan buffer 145, a second FIFO register 146, and a transform and inverse transform buffer (TITB) 147. The residue macroblock buffer 141 stores macroblock residue values for motion compensation. The motion compensation reference macroblock buffer 142 stores reference pixels for motion compensation. The first FIFO register 143 stores the decoding parameters. The reconstructed macroblock buffer 144 stores the reconstructed macroblocks generated by motion compensation and filtered macroblocks generated by loop filtering. The codec unit 124 may read the reconstructed macroblocks generated by the codec unit 124 from the reconstructed macroblock buffer 144, and perform loop filtering to the reconstructed macroblocks, and then write back the filtered macroblock to the reconstructed macroblock buffer 144. The scan buffer 145 stores the inputting data of the transform and inverse transform acceleration circuit 123. For example, while performing a transform, the inputting data are macroblock residue values. While performing an inverse transform, the inputting data are residue values after entropy decoding, e.g. inverse variable length coding. The second FIFO register 146 stores the RLL codes used by the transform and inverse transform acceleration circuit 123. The transform and inverse transform buffer 147 stores the output values of the transform and inverse transform acceleration circuit 123.

The hardware accelerator controller 121 may read the decoding parameters from the first FIFO register 143, and set up and manage each component of the codec module 120. When the hardware of the codec module 120, e.g. codec unit 124, receives the interrupt signal, which indicates completion of macroblock decoding, from the hardware accelerator controller 121, the hardware accelerator controller 121 may read the decoding parameters from the first FIFO register 143 and set up the codec module 120, and then activate the hardware accelerators to decode the next macroblock based on the decoding status. When the hardware of the codec module 120 has completed decoding a frame, the hardware accelerator controller 121 may generate an interrupt signal and transmit the interrupt signal to the processing unit 110. In addition, the hardware accelerator controller 121 may further copy the reference macroblocks used by motion compensation from the external storage unit 130 to the internal storage unit 140.

B. Implementation of Transform and Quantization Processes
B-1. Implementation of Encoding and Decoding Processes In the invention, various video codec standards can be integrated in to a system architecture based on features of various transform and quantization, thereby effectively reducing the area of logic gate circuits. In an embodiment, at least the following video codec standards are compatible with the provided system architecture of the invention, such as 4×4 DCT transform and inverse transform, 4×4 Hadamard transform and inverse transform, 2×2 Hadamard transform and inverse transform/quantization and inverse quantization in the H.264 encoding processes; quantization and inverse quantization, 4×4 DCT transform and inverse transform, 4×4 Hadamard transform and inverse transform, 2×2 Hadamard transform and inverse transform in the H.264 decoding processes; quantization and inverse quantization, 4×4 DCT transform and inverse transform, 4×4 Walsh-Hadamard transform and inverse transform in the VP8 codec processes; and quantization and inverse quantization, 4×4 transform and inverse transform, square 4×4 transform and inverse transform in the Real Video standards such as RV8, RV9 and RV10.

Figure 2:
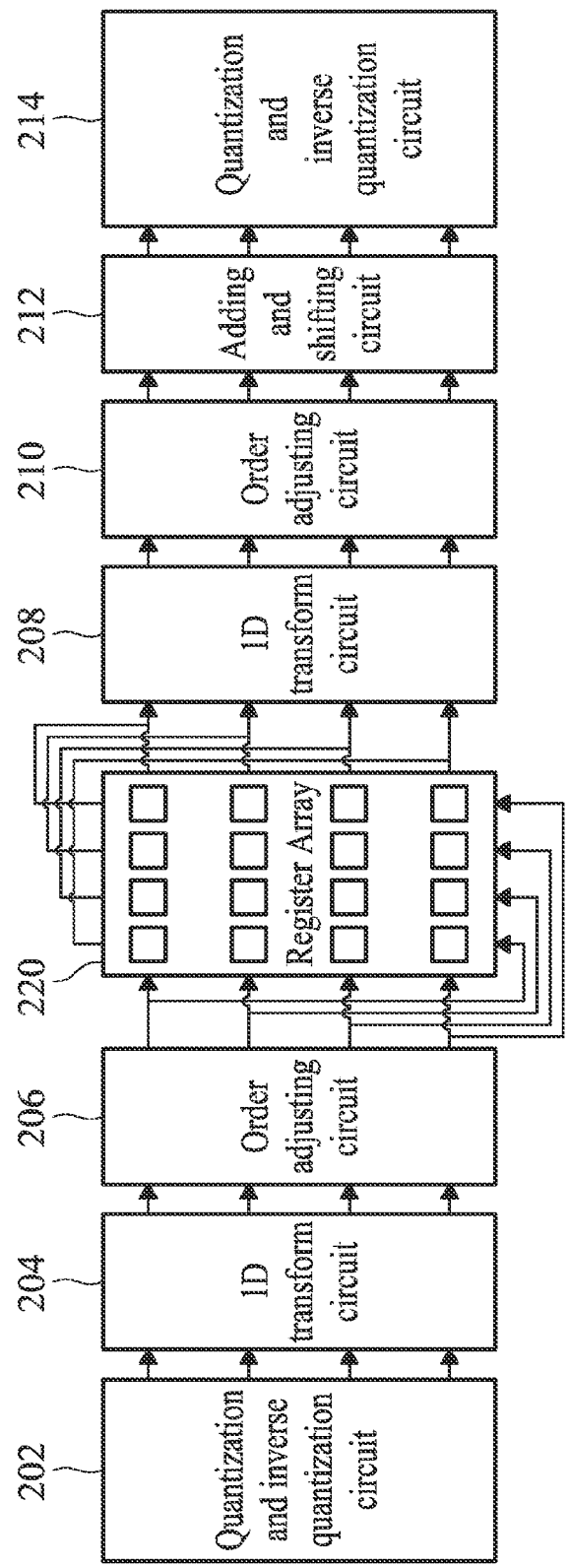
FIG. 2 is an architecture diagram of circuits implementing transform and quantization processes in accordance with an embodiment of the invention.

FIG. 2 is an architecture diagram of circuits implementing transform and quantization processes in accordance with an embodiment of the invention. In the embodiment, the codec module 120 reads the decoding results from the processing unit 110 or the output from other accelerators to perform the operations of transform/quantization or inverse quantization/inverse transform. After finishing the aforementioned operations, the codec module 120 may transmit the results to the processing unit 110 or other hardware accelerators for subsequent processes.

As illustrated in FIG. 2, the transform and inverse transform acceleration circuit 123 shown in FIG. 1 may include quantization and inverse quantization circuits 202 and 214, one-dimensional (1D) transform circuits 204 and 208, order adjusting circuits 206 and 210, an adding and shifting circuit 212, and a register array 220. The register array 220 may be a 16-bit 4×4 register array, configured to transpose the intermediate data during the transform and inverse transform processes.

In the embodiment, a two-dimensional (2D) transform can be completed effectively in a single process, and the quantization/inverse quantization processes of various codec standards can be implemented by using the architecture of the invention.

First, the quantization and inverse quantization circuit 202 may perform quantization processes to the inputting data based on the video codec standard used in the encoding processes. I.e. if the H.264 encoding is used or H.264 decoding with Hadamard transform is performed, the quantization and inverse quantization circuit 202 can be ignored. In the transform processes, the coefficients of the quantization and inverse quantization circuit 202 are set up to the quantization parameters, and the details will be described in the embodiment accompanied with FIG. 4. Afterwards, the one-dimensional transform circuit 204 may read a column of data from the transform and inverse transform buffer 147, and execute one-dimensional transform, e.g. one-dimensional column transform. In the aforementioned video codec standards, the 2D DCT or 2D Hadamard transform can be separated into two 1D transforms, and the H.264 2×2 Hadamard transform can be converted into a one-dimensional 1×4 transform. The details of the 1D transforms will be described later. Then, the order adjusting circuit 206 may adjust the order of the output data after the 1D transform based on different codec standards, and store the data in the register array 220. It should be noted that the transform and inverse transform acceleration circuit 123 has to perform iterations of 1D column transform 4 times for a 4×4 macroblock, thereby completing the 1D column transform of each column of the 4×4 macroblock. In other words, when the transform and inverse transform acceleration circuit 123 has repeated the 1D column transform or 1D row transform 4 times, the corresponding 1D row transform or 1D column transform can be repeated again to complete the 2D transform. It should be noted that, when the transform and inverse transform acceleration circuit 123 performs a 1D column transform, the transformed data is written into the register array 220 from left to right. When performing a 1D row transform, four data in a row are read out from the register array 220 from top to bottom for calculation, thereby retaining synchronous writing and reading operations.

In the embodiment, the reading and writing operations for the 1D transforms in the register array 220 are further described. There are two input/output modes of the register array 220, and the reading/writing accesses are performed synchronously. Since the size of the register array 220 is 4×4, the order adjusting circuit 206 may first write four rows of pixels row by row, as illustrated in four horizontal arrows located at the left side of the register array in FIG. 2. After the four rows of pixels are written into the register array 220, there is a 4×4 data array in the register array 220. The 4×4 data array is read out to the 1D transform circuit 208 column by column, as illustrated in four arrows located at the upper side of the register array 220 in FIG. 2. Afterwards, the order adjusting circuit 206 may write the four columns of data to the register array 220 column by column, as illustrated by four arrows located at bottom side of the register 220 in FIG. 2. After 4 rows of data have been written into the register array 220, there is another 4×4 data array in the register array 220 again. Then, the 4×4 data array will be read out to the 1D transform circuit 208 row by row, as illustrated in four horizontal arrows located at the right side of the register array 220 in FIG. 2. Meanwhile, the order adjusting circuit 206 may write the pixels into the register array 220 row by row again, and the aforementioned operations are performed repeatedly until all pixels of a macroblock are processed. It should be noted that the second 1D transform can be completed by reading out the data from the register array 220 to the 1D transform circuit 208. Accordingly, when complete 1D row transform and 1D column transform are performed on a 4×4 macroblock, results of 2D transform of the 4×4 macroblock can be obtained. In an embodiment, the 1D transform circuit 204 and the 1D transform circuit 208 are implemented using the same circuit. In other embodiments, the 1D transform circuit 204 and the 1D transform circuit 208 are implemented using the different circuits. In view of the above, the 2D transform of pixels in a macroblock can be implemented by using two 1D transform circuit with the register array 220.

In the aforementioned embodiment, the output data generated by the 1D transform circuit 208 are the result of two 1D transforms, and the output data are inputted to the order adjusting circuit 210. The order adjusting circuit 210 may adjust the inputting data based on the selected video codec standard. It should be noted that a 1×4 1D transform can be used to implement the 2×2 Hadamard transform in the H.264 standard, and thus the transform results can be obtained by using the 1D transform circuit 204 and the order adjusting circuit 206. That is, regarding the 2×2 Hadamard transform in the H.264 standard, the 1D transform circuit 208 and the order adjusting circuit 210 can be ignored. It should also be noted that, in an embodiment, the order adjusting circuit 210 and the order adjusting circuit 206 can be implemented by the same circuit which alternates the data order after a 1D row/column transform. In another embodiment, the order adjusting circuit 210 and the order adjusting circuit 206 can be implemented by different circuits.

Further, the adding and shifting circuit 212 may perform adding and shifting operations to the order-adjusted data based on the selected video codec standard, thereby completing the encoding process and obtaining the encoded data.

During the decoding process, the data will be processed through each of the components shown in FIG. 2 from right to left. In other words, the data may first be input to the quantization and inverse quantization circuit 214, and the coefficients of the quantization and inverse quantization circuit 214 can be set to the inverse quantization coefficients, and the details will be described in the embodiment accompanied with FIG. 4. It should be noted that, during the transform process, the quantization and inverse quantization circuit 214 is not required. In an embodiment, since the operations of transform and inverse transform will not be performed simultaneously, the quantization and inverse quantization circuits 214 and 202 can be implemented using the same circuit, and the coefficients are set to quantization coefficients during the encoding process, and set to inverse quantization coefficients during the decoding process. In other embodiments, the quantization and inverse quantization circuits 214 and 202 can be implemented using different circuits.

Afterwards, the inputting data may continue passing through the adding and shifting circuit 212, the order adjusting circuit 210, the 1D transform circuit 208, the register array 220, the order adjusting circuit 206, and the 1D transform circuit 204, and the decoded data can be obtained. In some embodiments, the 1D transform circuits 208 and 204 can be implemented by the same circuit, wherein the coefficients of the 1D transform circuits 208 and 204 can be set to the inverse transform coefficients based on the selected video codec standard. It should be noted that the quantization and inverse quantization circuit 202 is not required during the decoding process.

In addition, for encoding/decoding operations, the data are stored in an input storage unit (not shown) before being inputted to the transform and inverse transform acceleration circuit 123. The processed data are stored in an output storage unit (not shown) after the encoding/decoding operations are completed. Since the encoding/decoding operations are performed macroblock by macroblock, the aforementioned input storage unit and output storage unit are implemented by using the ping-pong buffer architecture (not shown). When a macroblock is being processed, the next macroblock is stored in the ping-pong buffer, thereby implementing the flow control between different circuits.

Furthermore, the details of the quantization and inverse quantization circuits 202 and 214, 1D transform circuits 204 and 208, order adjusting circuits 206 and 210, and adding and shifting circuit 212 of the transform and inverse transform acceleration circuit 123 will be described in the following section accompanied with FIG. 3.

Figure 3:
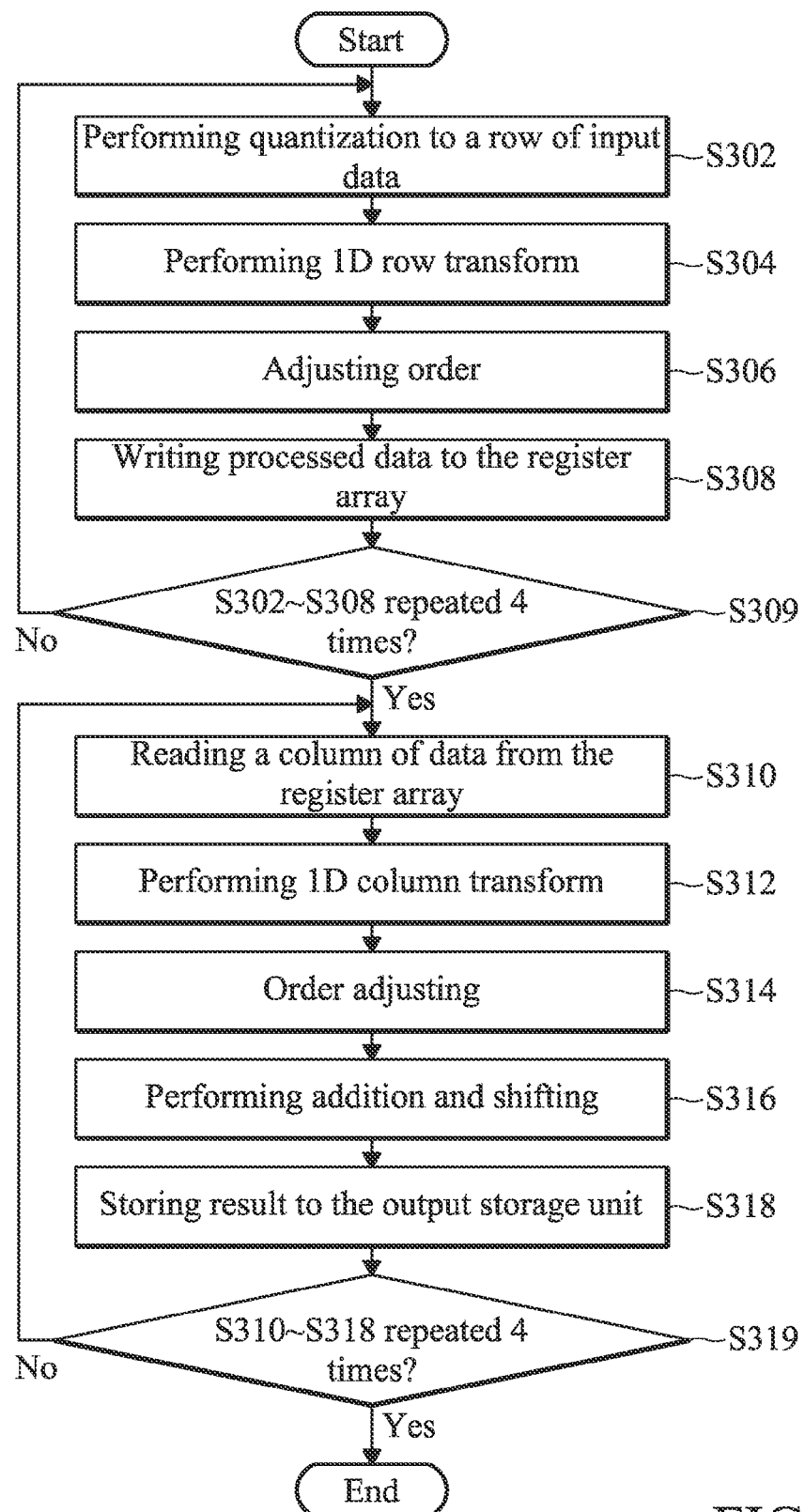
FIG. 3 is a flow chart illustrating the encoding operations performed by the transform and inverse transform acceleration circuit 123 in accordance with an embodiment of the invention.

FIG. 3 is a flow chart illustrating the encoding operations performed by the transform and inverse transform acceleration circuit 123 in accordance with an embodiment of the invention. Referring to both FIG. 2 and FIG. 3, briefly, the flow shown in FIG. 3 is to clearly describe the operations of the transform and inverse transform acceleration circuit 123 in FIG. 2. The input four data in a row are quantized by the quantization and inverse quantization circuit 202 of the transform and inverse transform acceleration circuit 123 (step S302). It should be noted that the flow of FIG. 3 shows the encoding operations, and the coefficients used by the quantization and inverse quantization circuit 202 are quantization coefficients, and the step can be omitted if the decoding operations are performed. Then, the 1D transform circuit 204 may perform 1D row transform on the quantized data in a row based on the selected video codec standard (step S304). The order adjusting circuit 206 may adjust the order of the 1D-column-transformed data based on the requirement of the selected video codec standard (step S306), and write the four adjusted results into a column of the register array 220 (step S308). It should be noted that the transform and inverse transform acceleration circuit 123 may determine whether steps S302~S308 have been repeated 4 times (step S309). If so, the 1D row transform operations of all rows in a 4×4 macroblock are completed, and there are 16 data in four columns in the register array 220, and then step S310 is performed. Otherwise, step S302 is performed.

When steps S302~S308 have been repeated for 4 times, the 1D transform circuit 208 may retrieve a column of data from the register array 220 (step S310), and perform 1D column transform to the retrieved column of data (step S312). Afterwards, the order adjusting circuit 210 may adjust the order of the 1D-column-transformed data based on the requirement of the selected video codec standard (step S314), and the adding and shifting circuit 212 may perform adding and shifting operations to the adjusted data based on the selected video codec standard (step S316). The transform and inverse transform acceleration circuit 123 may write the added/shifted data, i.e. the encoded results, to the output buffer (step S318). It should be noted that the quantization and inverse quantization circuit 214 is omitted during the encoding process. However, the processed data should be inverse quantized during the decoding process. In step S319, the transform and inverse transform acceleration circuit 123 may determine whether steps S310~S318 have been repeated for 4 times. If so, the 1D column transform operations of all columns in the 4×4 macroblock are completed. That is, the 2D transform operations of the 4×4 macroblock are completed by the 1D row transform operations followed by the 1D column transform operations. Otherwise, step S310 is performed.

B-2. Implementation of Quantization and Inverse Quantization

Figure 4A:
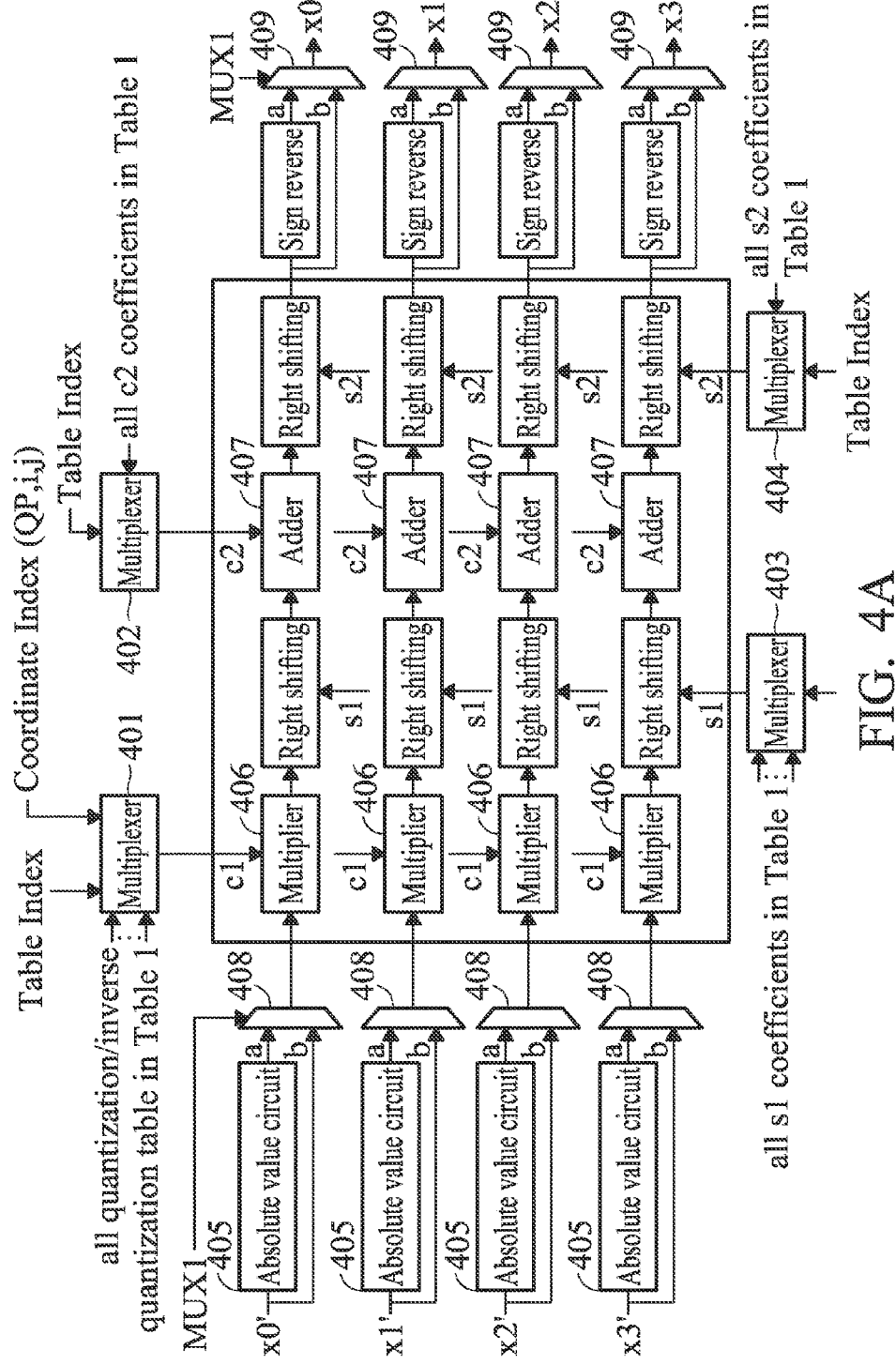
FIG. 4A is a schematic block diagram of the quantization and inverse quantization circuit in accordance with an embodiment of the invention.

FIG. 4A is a schematic block diagram of the quantization and inverse quantization circuit in accordance with an embodiment of the invention. FIG. 4B is a diagram illustrating the definitions of decoding coefficients for Real Video decoding operations by the quantization and inverse quantization circuit in accordance with an embodiment of the invention. Attention now is directed to FIG. 2, FIG. 4A and FIG. 4B.

As shown in FIG. 4A, the quantization and inverse quantization circuit 202 may process 4 ways of inputting data simultaneity, and may also select 1~4 of the 4 ways based on the resources of logic circuits. For video encoding processes, since four coefficients can be output by the discrete cosine transform (DCT) operation, 4 ways of inputting data can be used to increase the performance. However, for video decoding processes, data are processed sequentially during variable length decoding and inverse scan operations, and thus one way of inputting data is used to conserve the resources of the logic circuits.

In an embodiment, as shown in FIG. 4A, the encoding circuits and decoding circuits are integrated into one circuit, and the definition of the control signal MUX1 of the multiplexers 408 and 409 is shown as follows: When MUX1=0, it indicates that the encoding process is performed and the upper input a of each multiplexer is selected; when MUX1=1, it indicates that the decoding process is performed and the lower input b of each multiplexer is selected. For example, the control signal MUX1 can be from the hardware accelerator controller 121. Since four ways of inputting data are used in the aforementioned embodiments, there are four identical quantization units deployed each way in the quantization and inverse quantization circuit, wherein the operations and coefficients of each way are the same. It should be noted that the invention is not limited to the aforementioned embodiments, and a quantization unit having more or fewer ways can be used in accordance with practical needs.

Various quantization/inverse quantization coefficients used in the quantization and inverse quantization circuits 202 and 214 for different video codec standards are defined in Table 1, such as DCT and iDCT coefficients, Hadamard transform and inverse Hadamard transform coefficients, RV9 luminance/chrominance inverse transform coefficients, and the details can be referred to in Table 1.

TABLE 1

| Index | Standard | Range | c1 | s1 | c2 | s2 |
|---|---|---|---|---|---|---|
| 0000 | H.264 encoding | DCT coef | quant_coef[Q_rem, i, j] | 0 | offset | qbits |
| 0001 | | 4x4 Hadamard Coef | quant_coef[Q_rem, 0, 0] | 0 | 2* offset | qbits + 1 |
| 0010 | | 2x2 Hadamard Coef | quant_coef[Q_rem, 0, 0] | 0 | 2* offset | qbits + 1 |
| 0011 | H.264 decoding | iDCT Coef | dequant_coef[Q_rem, i, j] | Q_per | 0 | 0 |
| 0100 | | 4x4 Hadamard Coef | dequant_coef[Q_rem, 0, 0] | Q_per | 2 | 2 |
| 0101 | | 2x2 Hadamard Coef | dequant_coef[Q_rem, 0, 0] | Q_per | 0 | 1 |
| 0110 | VP8 decoding | Luminance iDCT Coef | Y1dequant[i, j] | 0 | 0 | 0 |
| 0111 | | Walsh-Hadamard Coef | Y2dequant[i, j] | 0 | 0 | 0 |
| 1000 | | Chrominance iDCT Coef | UVdequant[i, j] | 0 | 0 | 0 |
| 1001 | RV decoding | RV9 lumiance inverse transform coef | B[QP] | 0 | 8 | 4 |
| 1010 | | RV9 chrominance inverse transform coef | B[chroma_QP_map [QP]] | 0 | 8 | 4 |
| 1011 | | RV9 quadratic inverse transform, Intra-MB | B[QP], first 3 coeffs: luma_intra_quant_DC[QP] | 0 | 8 | 4 |
| 1100 | | RV9 quadratic inverse transform, Inter-MB | B[QP], first 3 coeffs: luma_inter_quant_DC[QP] | 0 | 8 | 4 |
| 1101 | | RV8 quadratic inverse transform | B[QP], first 3 coeffs: luma_quant_DC[QP] | 0 | 8 | 4 |

For example, the left most column of Table 1 illustrates the index used in each multiplexer shown in FIG. 4A, and the coefficients associated with the video codec standard can be selected by inputting the corresponding index number.

The query table used in the c1 column of Table 1 is obtained from the associated video codec standard or reference codes. The conditions and ranges of the operations performed by the quantization and inverse quantization circuit 202 can be queried from Table 1. That is, the associated c1 coefficients can be retrieved from Table 1. In addition, it should be noted that parameter chroma_QP_map may be the alternating parameter chroma_QP_map AC or the direct parameter chaomr_QP_map DC defined in the video codec standard. Furthermore, the first 3 coefficient of the quadratic inverse transform in the decoding process of the Real Video standard are shown in FIG. 4B, which indicates the values at positions C0, C1 and C2 of the 4×4 array.

Specifically, other coefficients in Table 1 are defined as follows: the coefficient QP indicates the quantization factor. For example, in the H.264 standard, QP indicates the luminance quantization factor, QPc indicates the chrominance quantization factor, and i and j indicate the location index of the coefficient in the 4×4 array.

The definition of the parameter Q_rem in the c1 column of Table 1 is shown as follows:
Q_rem=QP %6 (H.264 luminance); or
Q_rem=QPc %(H.264 chrominance)

The definition of the parameter Q_per of the s1 column of Table 1 is shown as follows:
Q_per=QP/6 (H.264 luminance); or
Q_per=QPc/6 (H.264 chrominance)

The definitions of the parameters c2 and qbits and offset in the s2 columns are shown as follows:
qbits=15+floow(QP/6), wherein floor(x) indicates the largest integer smaller than or equal to x.
Regarding intra-frame macroblocks, offset=$2^{qbits}/3$
Regarding inter-frame macroblocks, offset=$2^{qbits}/6$ It should be noted that the calculation of the offset value is defined in the H.264 standard. Table 1 is obtained by summarizing each video codec standard in the invention, and one having ordinary skilled in the art may easily implement the quantization and inverse quantization circuit shown in FIG. 4A by using Table 1 and the aforementioned embodiments.

For example, during the transform process such as DCT in H.264, four ways of input signals x0', x1', x2' and x3' are input to the quantization circuit. The index numbers of the multiplexers 401, 402, 403 and 404, which indicate the index of the DCT in "H.264 encoding" field of Table 1, are 0, 0, 0, 0, respectively. Accordingly, the coefficients c1, c2, s1, s2 for the DCT in the H.264 encoding process are input to the quantization circuit. The coordinate index (QP, i, j) indicates the type and coordinates of the data of the macroblock being currently processed. The type and coordinate information is required to determine the coefficient c1, which depends on the type of luminance data or chrominance data, and the coordinates of the luminance/chrominance data in the macroblock. Taking the data x0' as an example, the control signal MUX1=0 and the multiplexers 408 and 409 may select the upper input a. Accordingly, the absolute value circuit 405 may calculate the absolute value of the input x0'. Afterwards, the data |x0'| is multiplied with the coefficient c1 by the multiplier 406. Referring to Table 1, the coefficient c1 is quant_coef[Q_rem, i, j] in the DCT of the H.264 encoding process, and the value of c1 corresponds to the type of data and position. Then, |x0'| * quant_coef [Q_rem, i, j] is shifted right by s1 digits, wherein the value of s1 is 0 in DCT of the H.264 encoding process. Then, the coefficient c2 is added in the adder 407, thereby obtaining the offset value. The value of the offset value depends on whether an intra-frame macroblock or an inter-frame macroblock is selected. Subsequently, the offset value is further shifted right by s2 bits, which is "qbits" defined in Table 1 in this case. At least, since the upper input a is selected by the multiplexer 409 for encoding, the obtained data should be sign-reversed. It should be noted that since the absolute value is obtained in the circuit 405, performing the sign-reverse operation to the absolute value is to recover the original sign of the original data, which may be a positive or negative number, thereby obtaining the quantized data x0.

For one having ordinary skill in the art, Table 1 and FIGS. 4A-4B can be used to set up the quantization and inverse quantization circuit, and the details will be omitted here.

B-3. Implementation of 1D Transform and 1D Inverse Transform

Figure 5A:
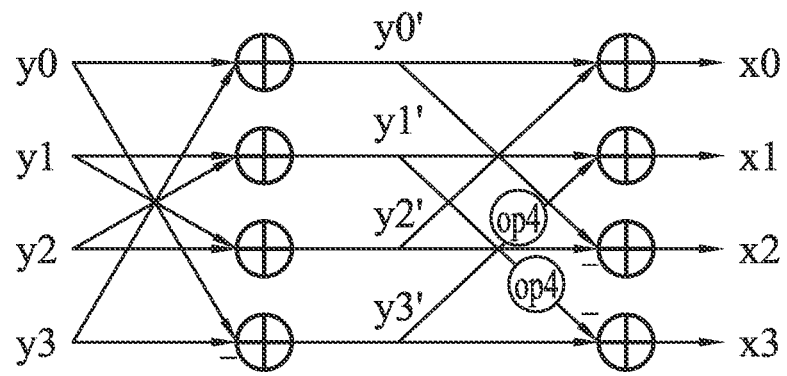
FIGS. 5A~5G are architecture diagrams of 1D transform circuits compatible with various video codec standards in accordance with some embodiments of the invention.
Figure 5B:
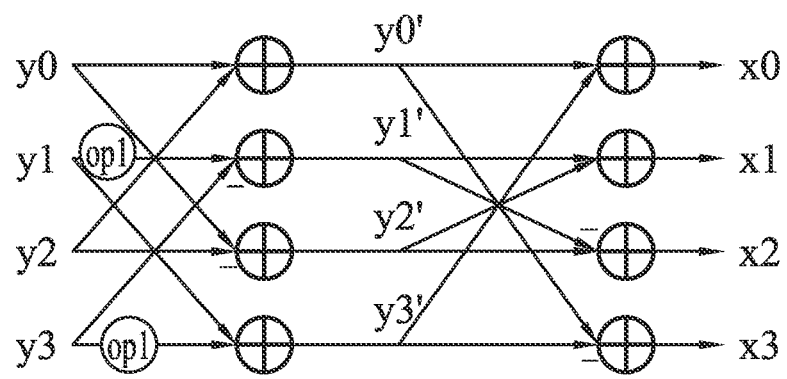
Figure 5C:
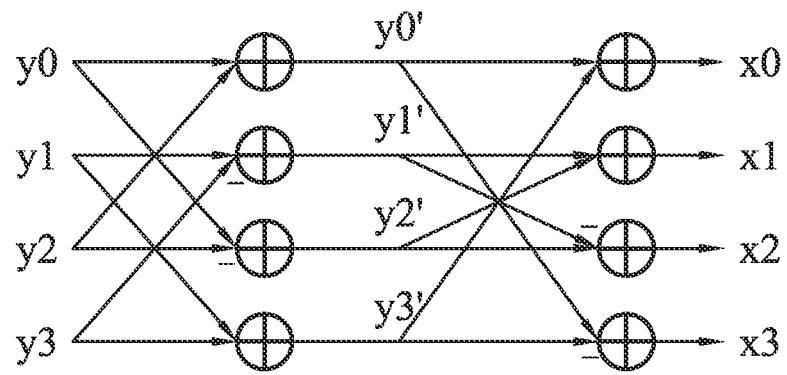
Figure 5D:
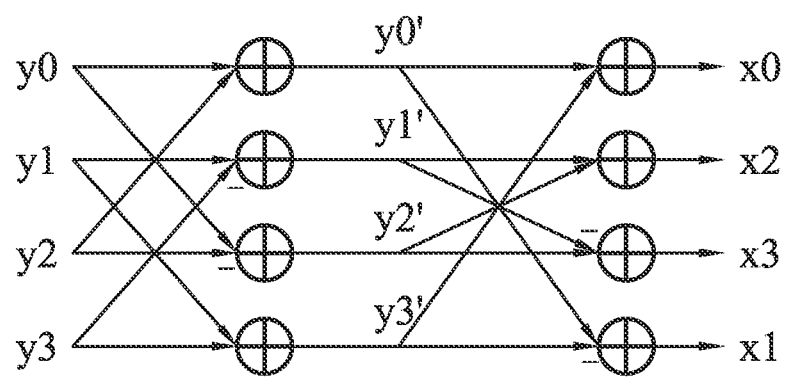

FIGS. 5A~5G are architecture diagrams of 1D transform circuits compatible with various video codec standards in accordance with some embodiments of the invention. For example, there are four circuit modes for the H.264 codec standards, such as a 1D DCT architecture of the H.264 standard shown in FIG. 5A, a 1D iDCT architecture of the H.264 standard shown in FIG. 5B, a 1D Hadamard transform and inverse transform architecture of the H.264 standard shown in FIG. 5C, which may be applied to a 4×4 luminance macroblock, and a 2D Hadamard transform and inverse transform architecture of the H.264 standard shown in FIG. 5D, which may be applied to a 2×2 chrominance macroblock. It should be noted that the 2D Hadamard transform architecture in FIG. 5D is to directly compute the 2D Hadamard transform of a 2×2 chrominace macroblock without being divided into a 1D column transform and 1D row transform as computing the 2D Hadamard transform of a 4×4 luminance macroblock.

Figure 5E:
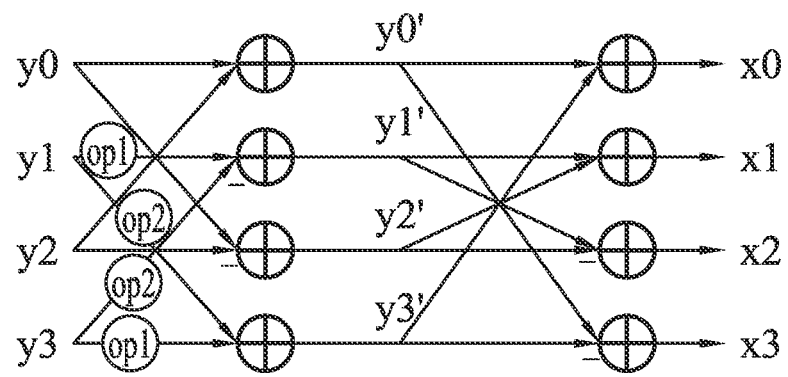
Figure 5F:
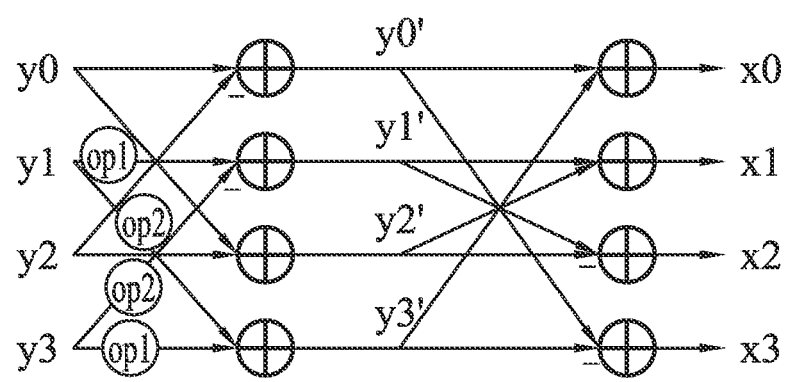
Figure 5G:
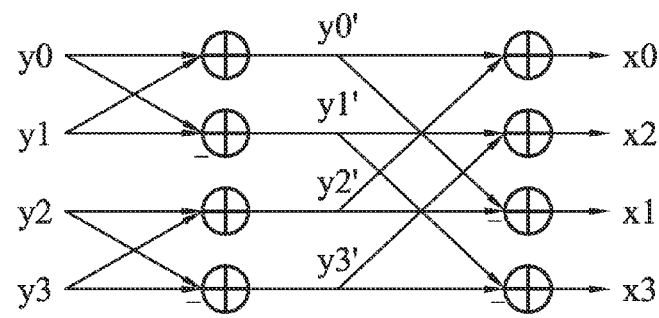

Taking the Real Video and VP8 standard as an example, there are three circuit modes, such as a 1D iDCT architecture of the Real Video standard shown in FIG. 5E, a 1D iDCT architecture of the VP8 standard shown in FIG. 5F, and a Walsh-Hadamard transform and inverse transform architecture of the VP8 standard shown in FIG. 5G. As shown in FIGS. 5A~5G, the values y0~y3 are the input values of the 1D transform or inverse transform, and the values x0~x3 are the output values after the 1D transform or inverse transform, and the values y0'~y3' are the intermediate values during the 1D transform or inverse transform. The number of operations OP1, OP2, OP3 and OP4 are the coefficient values defined in various transforms based on their numeric features. The coefficient values and equations for various video codec standards are preset into the 1D transform circuit of the invention. Accordingly, if the 1D transform or inverse transform of a specific video codec standard is to be performed, the circuit corresponding to the specific video codec standard can be selected from the circuits of FIGS. 5A~5G, thereby obtaining the results of the 1D transform or inverse transform. The number of operations OP1, OP2, OP3, and OP4 are defined in Table 2 as follows:

TABLE 2

|  | OP1 | OP2 | OP3 | OP4 |
|---|---|---|---|---|
| H.264 1D DCT |  |  |  | >>1 |
| H.264 1D iDCT | <<1 |  |  |  |
| Real Video 1D inverse transform | 7 | 17 | 13 |  |
| VP8 1D iDCT | (y* 35468) >> 16 | 8 + (y* 20091) >> 16) |  |  |

If the field in the OP1 and OP2 columns is empty, it may indicate that no operation is required in the selected video codec standard. For example, only the value OP4 is used in FIG. 5A, and only the value OP4 is available in the row "H.264 1D DCT" of Table 2, e.g. shift right by 1 digit. As shown in FIG. 5E, the values OP1, OP2 and OP3 are used, and the values OP1, OP2, and OP3 are available in the row "Real Video 1D inverse transform" of Table 2.

The operations shown in FIGS. 5A~5G and Table 2 are well-known, and a person skilled in the art may obtain the results of 1D transforms by using FIGS. 5A~5G, and the details will be omitted here.

Figure 6:
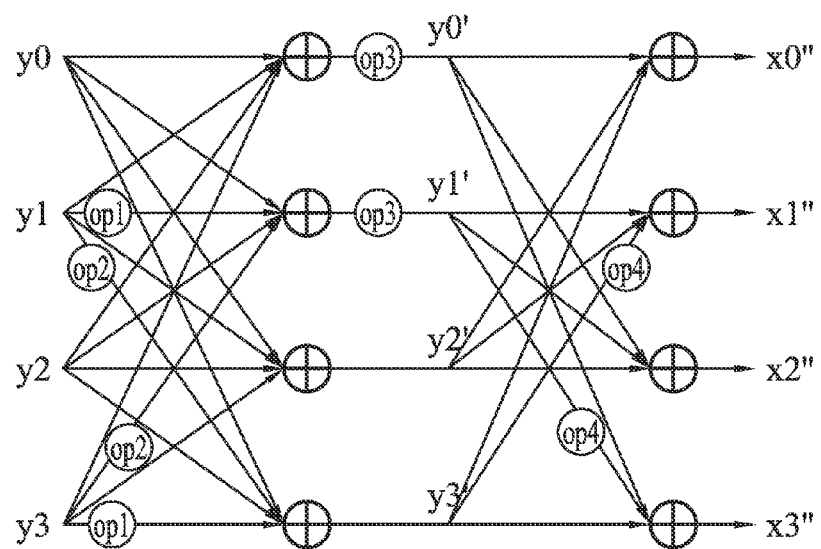
FIG. 6 is an architecture diagram of an integrated 1D transform circuit in accordance with an embodiment of the invention.

FIG. 6 is an architecture diagram of an integrated 1D transform circuit in accordance with an embodiment of the invention. Specifically, all the transform and inverse transform circuits in FIGS. 5A~5G can be integrated, thereby obtaining a 1D transform circuit 600 compatible with H.264, Real Video, and VP8 standards, as shown in FIG. 6. The definitions of values OP1, OP2, OP3 and OP4 in FIG. 6 can be referred to in Table 2. Accordingly, a single 1D transform circuit can be used to calculate the 1D transform or inverse transform on any inputting data by setting up the coefficients corresponding to the selected video codec standard, thereby effectively reducing the area of the logic circuits.

There are four processing paths of 1D transform circuits in FIG. 6 in accordance with the aforementioned embodiment having four ways of inputting data, and the operations and coefficients in each way are defined based on the selected video codec standard. It should be noted that the invention is not limited to the aforementioned embodiment, and more or fewer processing paths of 1D transform circuits can be used according to practical needs.

B-4. Implementation of Order Adjusting Circuit

Figure 7:
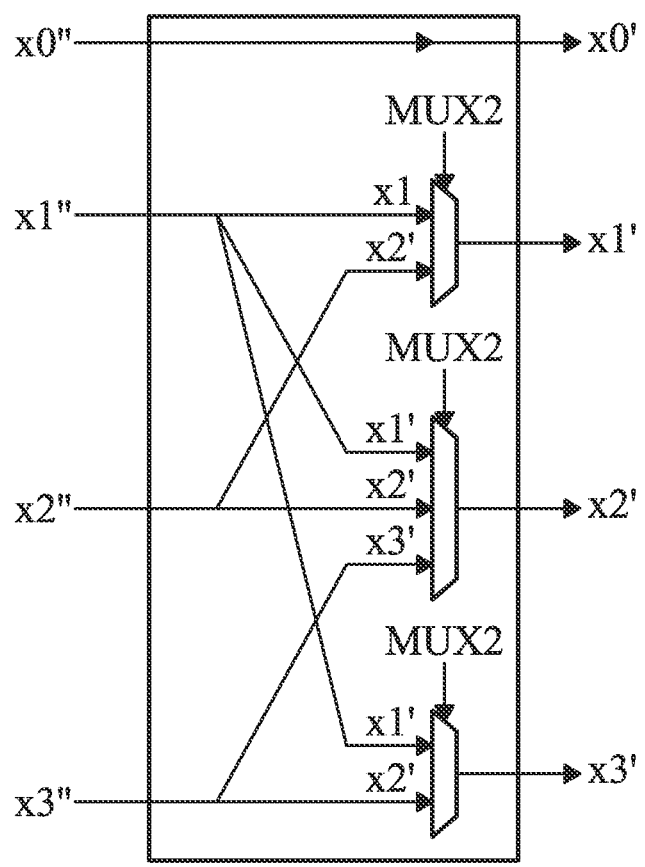
FIG. 7 is an architecture diagram of the order adjusting circuit in accordance with an embodiment of the invention.

FIG. 7 is an architecture diagram of the order adjusting circuit in accordance with an embodiment of the invention. Referring to FIGS. 5D and 5G, the input/output orders for H.264 2D Hadamard transform and VP8 1D Walsh-Hadamard transform are different. For example, in the H.264 2D Hadamard transform architecture shown in FIG. 5D, four results x0, x2, x3, x1 can be obtained after performing 1D transform to the four input signals y0, y1, y2 and y3. Accordingly, the order of the output signals should be adjusted, so that the adjusted order may be x0, x1, x2 and x3. Similarly, the order of the output signals obtained after performing VP8 1D Walsh-Hadamard transform should be adjusted. Regarding other video codec standards, the results can be output sequentially. In order to be compatible with various video codec standards, the order adjusting circuits 206 and 210 are added in the invention. As described above, the order adjusting circuits 206 and 210 can be implemented by using the same circuit. As illustrated in FIG. 7, the input values x0"~x3" and output values x0'~x3' are controlled by multiple multiplexers. The signal MUX2 is the control signal of the multiplexers, which may be from the hardware accelerator controller 121. The definition of the control signal MUX2 is shown in Table 3 as follows:

TABLE 3

| MUX2 | Output |
| --- | --- |
| 00 (H.264 2D Hadamard Transform) | x0' = x0"<br>x1' = x3"<br>x2' = x1"<br>x3' = x2" |
| 11 (VP8 1D Walsh-Hadamard Transform) | x0' = x0"<br>x1' = x2"<br>x2' = x1"<br>x3' = x3" |

TABLE 3-continued

| MUX2 | Output |
| --- | --- |
| 01/10 (Other Transforms) | x0' = x0"<br>x1' = x1"<br>x2' = x2"<br>x3' = x3" |

As illustrated in Table 3, if the H.264 2D Hadamard transform is performed, the control signal MUX2 is 00. If the VP8 1D Walsh-Hadamard transform is performed, the control signal MUX2 is 11. In addition to the two conditions, when the control signal MUX2 is 01 or 10, the output value is equal to the input value. Specifically, the intermediate values or results between the DCT, Hadamard transform, and Walsh-Hadamard transform may be mathematically related, and thus the intermediate values obtained by 1D transform or inverse transform can be arranged properly with a circuit having fewer logic gates.

There are four processing paths of order adjusting circuits in FIG. 7 in accordance with the aforementioned embodiment having four ways of inputting data, and the operations and coefficients in each way are defined based on the selected video codec standard. It should be noted that the invention is not limited to the aforementioned embodiment, and more or fewer ways of order adjusting circuits can be used according to practical needs.

B-5. Implementation of Adding and Shifting Circuit

Figure 8:
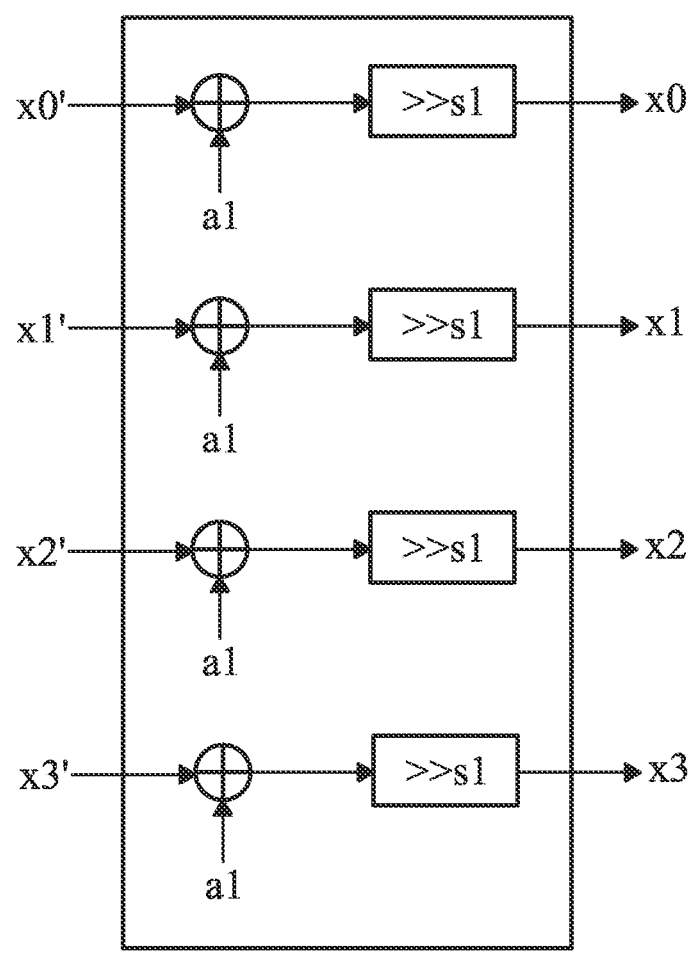
FIG. 8 is an architecture diagram of the adding-and-shifting circuit in accordance with an embodiment of the invention.

FIG. 8 is an architecture diagram of the adding and shifting circuit in accordance with an embodiment of the invention. In various video codec standards, addition and shifting operations should be further applied to the data after the transform operations. In the invention, the adding and shifting circuits for various video codec circuits are integrated, thereby reducing the area of logic circuits. As illustrated in FIG. 8, the adder of the adding and shifting circuit 212 may add the coefficient a1 with the input values x0'~x3', and right shift the addition results based on the coefficient s1, thereby obtaining the output values x0~x3. The definitions of the coefficients a1 and s2 are shown in Table 4 as follows:

TABLE 4

| 1D Transform Circuit | a1 | s1 | Remark |
| --- | --- | --- | --- |
| H.264 1D DCT | 0 | 0 | Could be omitted |
| H.264 1D iDCT | 32 | 6 | |
| H.264 1D Hadamard Transform | 1 | 1 | |
| H.264 2D Hadamard Transform | 0 | 0 | Could be omitted |
| RealVideo 1D iDCT | 512 | 10 | |
| VP8 1D iDCT | 4 | 3 | |
| VP8 1D Walsh-Hadamard Transform | 3 | 3 | |

For example, if the H.264 1D iDCT is performed by the 1D transform circuit, the coefficients a1 and s1 are 32 and 6, respectively. If the H.264 2D Hadamard transform is performed by the 1D transform circuit, the adding and shifting circuit can be omitted. That is, the output values x0~x3 are equal to the input values x0'~x3', respectively.

There are four ways of adding and shifting circuits in FIG. 8 in accordance with the aforementioned embodiment having four ways of inputting data, and the operations and coefficients in each way are defined based on the selected video codec standard. It should be noted that the invention is not limited to the aforementioned embodiment, and more or less ways of adding and shifting circuits can be used according to practical needs.

B-6. Definition of Non-Zero Flag (nz-flag)

Figure 9A:
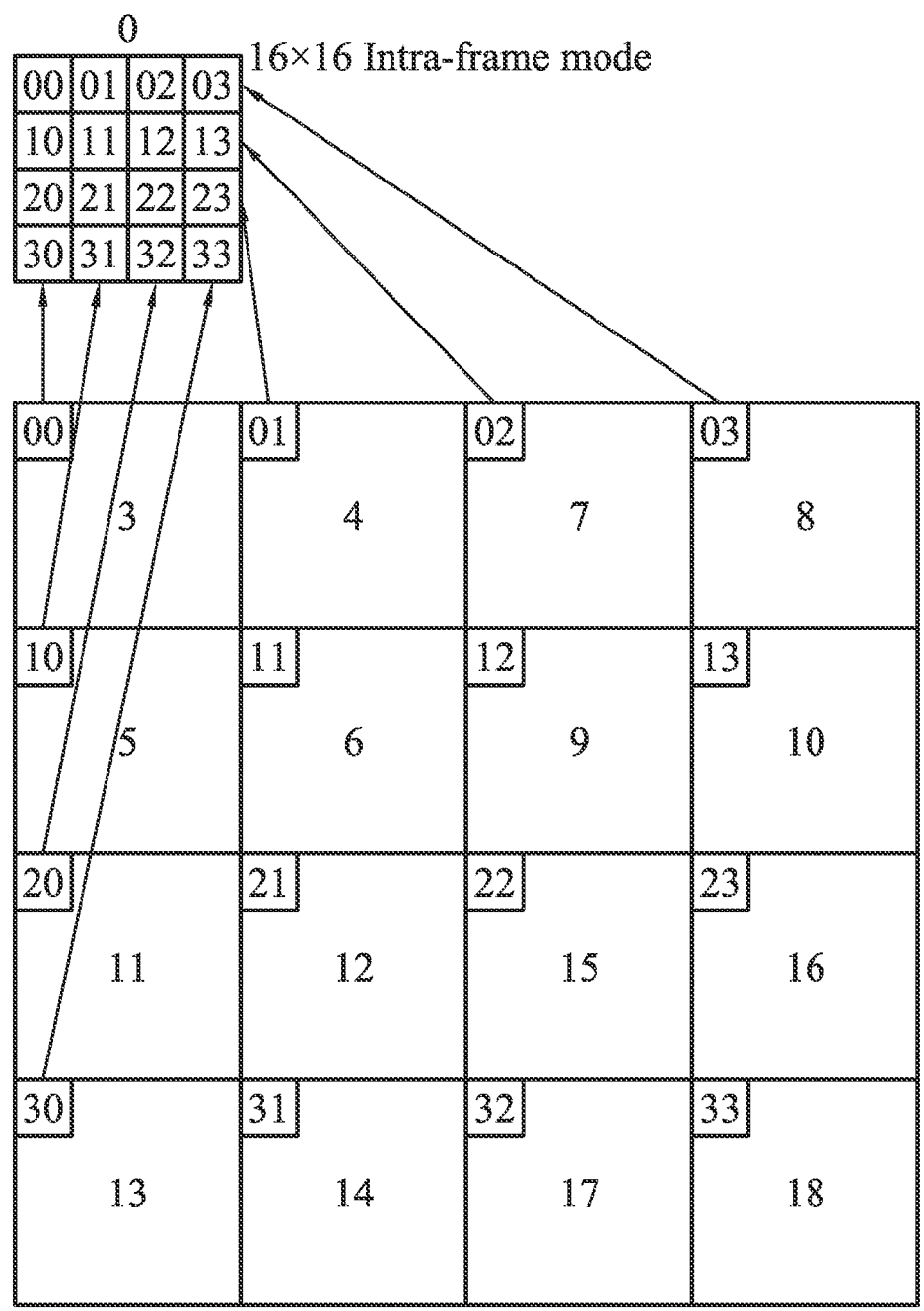
FIGS. 9A~9C are diagrams illustrating the processing order of the residue blocks of a macroblock in the H.264 standard in accordance with an embodiment of the invention.
Figure 9B:
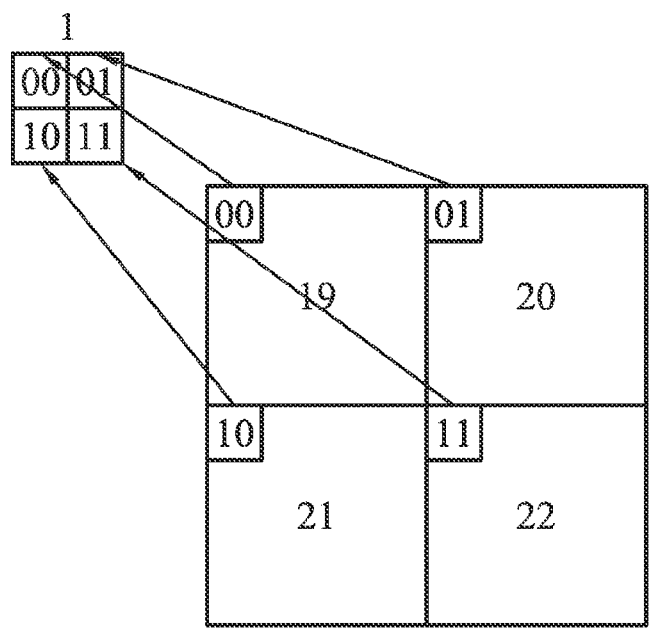
Figure 9C:
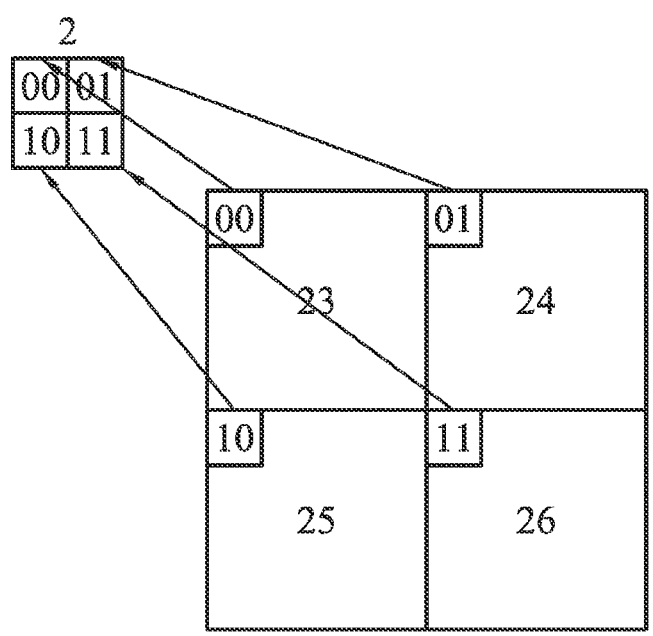

FIGS. 9A~9C are diagrams illustrating the processing order of the residue blocks of a macroblock in the H.264 standard in accordance with an embodiment of the invention. FIG. 10 is a diagram illustrating the non-zero flags in accordance with an embodiment of the invention. During video data encoding/decoding processes, if it can be known which macroblock has non-zero data and which macroblock only has data consisting of zeros, the non-zero data can be encoded and the zero data can be omitted, so that the computational complexity can be significantly reduced. Accordingly, non-zero flags are set in the invention. As illustrated in FIGS. 9A~9C, there are at most 27 sub-blocks including luminance blocks and chrominance blocks in a 16×16 macroblock. For example, FIG. 9A illustrates the luminance block corresponding to the 16×16 macroblock. FIG. 9B and FIG. 9C illustrate the chrominance blocks corresponding to the 16×16 macroblock. For those skilled in the art, it should be appreciated that there are 3 DC sub-blocks, which are labeled number 0, 1, and 2, and 24 non-DC sub-blocks in the 16×16 macroblock. The operations of the sub-blocks in addition to the sub-blocks 0, 1, and 2 can be referred to in the aforementioned embodiments, and the details will not be described here. To determine whether each sub-clock has non-zero residue data, a 27-bit parameter nz_flag[0:26] is used in the invention, as shown in FIG. 10. If a certain bit position of the parameter nz_flag is 1, it may indicate the corresponding sub-block includes non-zero residue data. Conversely, if the bit position is 0, it may indicate that the data of the corresponding sub-block are all zero. Regarding sub-blocks without non-zero residue data, the encoding/decoding operations can be omitted. It should be noted that FIGS. 9A~9C are based on the H.264 standard. Regarding the Real Video and VP8 standards, the sub-blocks labeled with 1 and 2 do not exist.

In view of the above, a quantization and inverse quantization acceleration circuit, and a transform and inverse transform acceleration circuit compatible with various video codec standards are provided in the invention. The aforementioned acceleration circuits can be used in a video codec system integrating hardware and software (e.g. one or more processors with hardware accelerators). Taking the H.264/AVC (Baseline Profile) standard as an example, the encoding performance being 1080 P@15 fps and the decoding performance being 1080 P@30 fps can be achieved with low frequency and low power in the invention. When the system frequency and bandwidth have been improved, the encoding/decoding performance with higher resolution and frame rate can be achieved. In addition, the quantization and inverse quantization acceleration circuit and the transform and inverse transform acceleration circuit can be arranged flexibly. Regarding to a video codec system having a limited area of logic circuits, at least one 1D transform circuit in the invention can be used to perform all the transform and inverse transform operations. Regarding the codec system having a requirement for higher speed, the number of 1D transform circuit can be increased properly to implement parallel computation. Since video encoding and decoding are supported by video codec system in the invention, the utilization of the accelerators can be increased. In addition, a 4×4 register array is used in the invention to transpose data in rows and columns freely. In the invention, the operations to each sub-block in a macroblock may become faster by using ping-pong buffers to perform flow control on trans-form/inverse transform and quantization/inverse quantization operations. In the invention, it is easier to determine whether each sub-block has non-zero residue values by using a 27-bit nz_flag.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transform and inverse transform circuit, comprising:
   at least one quantization and inverse quantization circuit, comprising:
      at least one quantization and inverse quantization unit, wherein the at least one quantization and inverse quantization unit comprises a plurality of first coefficients, and wherein the at least one quantization and inverse quantization unit is to perform quantization or inverse quantization on one of multiple ways of inputting data; and
      at least one first multiplexer, an absolute value unit, a sign reverse unit, and a first look-up table, wherein the at least one first multiplexer is to determine whether the absolute value unit is used and whether the sign reverse unit is used based on one processing path of the inputting data and the video codec standard, and is to set up the plurality of first coefficients based on the first look-up table and the video codec standard; and
   at least one one-dimensional transform circuit, coupled to the at least one quantization and inverse quantization circuit, wherein the at least one one-dimensional transform circuit comprises a plurality of second coefficients, wherein the one-dimensional transform circuit is to perform one-dimensional transform on a data processed by the quantization and inverse quantization circuit, and wherein the plurality of first coefficients and the plurality of second coefficients are set up based on a video codec standard.

2. The transform and inverse transform circuit as claimed in claim 1, wherein:
   the one-dimensional transform circuit comprises a second look-up table, and the one-dimensional transform circuit to set up the plurality of second coefficients based on the second look-up table and the video codec standard, and to perform one-dimensional column transform or one-dimensional row transform to the data processed by the quantization and inverse quantization circuit; and
   the video codec standard comprises: 4×4 one-dimensional discrete cosine transform and inverse discrete cosine transform, 4×4 Hadamard transform, 2×2 Hadamard transform in the H.264 standard, and 4×4 inverse discrete cosine transform, 4×4 Walsh-Hadamard transform in the VP8 standard, and 4×4 inverse transform and 4×4 quadratic inverse transform and corresponding quantization/inverse quantization operations in the Real Video standard.

3. The transform and inverse transform circuit as claimed in claim 1, wherein:
   the transform and inverse transform circuit comprises a plurality of the quantization and inverse quantization circuit and a plurality of the one-dimensional transform circuit, wherein at least one of the quantization and inverse quantization circuit is to perform quantization to the inputting data, and at least another one of the quantization and inverse quantization circuit is to perform inverse quantization to the inputting data, at least one of the one-dimensional transform circuits is to perform one-dimensional column transform to the data processed by the quantization and inverse quantization circuit, and at least another one of the one-dimensional transform circuits is to perform one-dimensional row transform to the data processed by the quantization and inverse quantization circuit; and the transform and inverse transform circuit is to determine whether a plurality of sub-block of the inputting data has non-zero data, and the sub-blocks not comprising non-zero data are not processed.

4. The transform and inverse transform circuit as claimed in claim 1, further comprising:
at least one order adjusting circuit coupled to the at least one one-dimensional transform circuit, wherein the at least one order adjusting circuit comprises a plurality of multiplexers and a look-up table, and the plurality of multiplexers are to adjust orders of the data processed by the one-dimensional transform circuit based on the video codec standard and the look-up table of the at least one order adjusting circuit.

5. The transform and inverse transform circuit as claimed in claim 4, further comprising:
at least one adding and shifting circuit, coupled to the order adjusting circuit, wherein the at least one adding and shifting circuit comprises a look-up table, wherein the adding and shifting circuit is to perform addition and shifting to the data processed by the order adjusting circuit based on the video codec standard and the look-up table of the at least one adding and shifting circuit.

6. The transform and inverse transform circuit as claimed in claim 1, further comprising:
a register array, coupled to the at least one one-dimensional transform circuit, wherein the register array is to:
store the data processed once by the one-dimensional transform circuit by row;
transmit the data processed once by the one-dimensional transform circuit to the one-dimensional transform circuit by column to perform the next one-dimensional transform;
store the data processed once by the one-dimensional transform circuit by column; and
transmit the data processed once by the one-dimensional transform circuit to the one-dimensional transform circuit by row to perform next one-dimensional transform; and
an input storage unit, coupled to the quantization and inverse quantization circuit, wherein the input storage unit stores the data with a ping-pong buffer.

7. A transform and inverse transform method, comprising:
performing quantization or inverse quantization to inputting data by using a quantization and inverse quantization circuit, wherein the quantization and inverse quantization circuit comprises:
at least one quantization and inverse quantization unit, and the at least one quantization and inverse quantization unit comprises a plurality of first coefficients, wherein the at least one quantization and inverse quantization unit is to perform quantization or inverse quantization on one of multiple ways of inputting data; and
at least one first multiplexer, an absolute value unit, a sign reverse unit, and a first look-up table, wherein the at least one first multiplexer is to determine whether the absolute value unit is used and whether the sign reverse unit is used based on the video codec standard and one processing path of the inputting data, and is to set up the plurality of first coefficients based on the first look-up table and the video codec standard; and performing one-dimensional transform to the data processed by the quantization and inverse quantization circuit by a one-dimensional transform circuit, wherein the one-dimensional transform circuit comprises a plurality of second coefficients, and wherein the plurality of first coefficients and the plurality of second coefficients are set up based on a video codec standard.

8. The transform and inverse transform method as claimed in claim 7,
wherein the one-dimensional transform circuit comprises a second look-up table, and the one-dimensional transform circuit sets up the plurality of second coefficients based on the second look-up table and the video codec standard, and performs one-dimensional column transform or one-dimensional row transform to the data processed by the quantization and inverse quantization circuit; and
wherein the video codec standard comprises: 4×4 one-dimensional discrete cosine transform and inverse discrete cosine transform, 4×4 Hadamard transform, 2×2 Hadamard transform in the H.264 standard, and 4×4 inverse discrete cosine transform, 4×4 Walsh-Hadamard transform in the VP8 standard, and 4×4 inverse transform and 4×4 quadratic inverse transform and corresponding quantization/inverse quantization operations in the Real Video standard.

9. The transform and inverse transform method as claimed in claim 7, wherein the transform and inverse transform circuit comprises a plurality of the quantization and inverse quantization circuits and a plurality of the one-dimensional transform circuits, and the method further comprises:
performing quantization to the inputting data by at least one of the quantization and inverse quantization circuit;
performing inverse quantization to the inputting data by at least another one of the quantization and inverse quantization circuits;
performing one-dimensional column transform to the data processed by the quantization and inverse quantization circuit by at least one of the one-dimensional transform circuits;
performing one-dimensional row transform to the data processed by the quantization and inverse quantization circuit by at least another one of the one-dimensional transform circuits; and
determining whether a plurality of sub-blocks of the inputting data has non-zero data, and the sub-blocks not comprising non-zero data are not processed.

10. The transform and inverse transform method as claimed in claim 7, further comprising:
adjusting the order of the data processed by the one-dimensional transform circuit by an order adjusting circuit, wherein the order adjusting circuit comprises a plurality of multiplexers and a look-up table, and wherein the plurality of multiplexers adjust orders of the data processed by the one-dimensional transform circuit based on the video codec standard and the look-up table of the order adjusting circuit.

11. The transform and inverse transform method as claimed in claim 10, wherein the quantization and inverse quantization circuit further comprises:

at least one adding and shifting circuit, coupled to the order adjusting circuit, wherein the at least one adding and shifting circuit comprises a look-up table, wherein the at least one adding and shifting circuit performs addition and shifting to the data processed by the order adjusting circuit based on the video codec standard and the look-up table of the at least one adding and shifting circuit.

12. The transform and inverse transform method as claimed in claim 7, further comprising:

utilizing a register to store the data processed once by the one-dimensional transform circuit by row;

transmitting the data processed once by the one-dimensional transform circuit to the one-dimensional transform circuit by column to perform the next one-dimensional transform; and storing the data processed once by the one-dimensional transform circuit by column;

transmitting the data processed once by the one-dimensional transform circuit to the one-dimensional transform circuit by row to perform the next one-dimensional transform; and utilizing an input storage unit to store the data with a ping-pong buffer.

\* \* \* \* \*